United States Patent Office 3,479,110
Patented Nov. 18, 1969

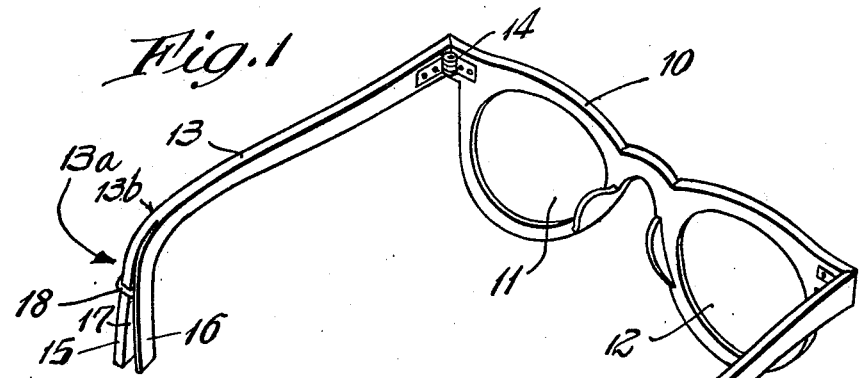
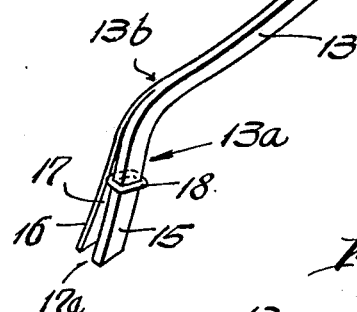
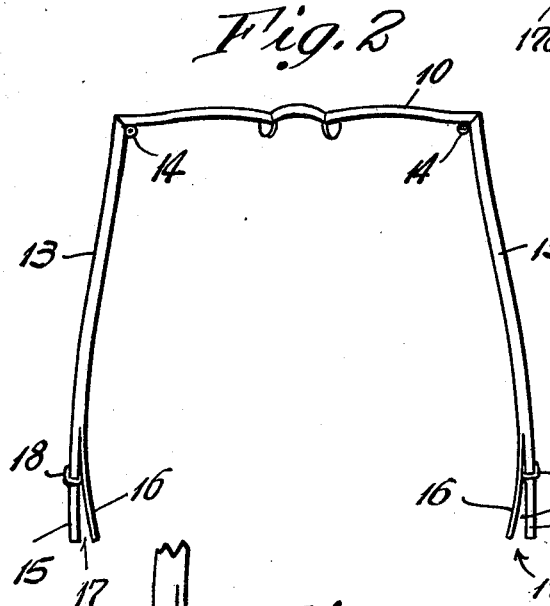
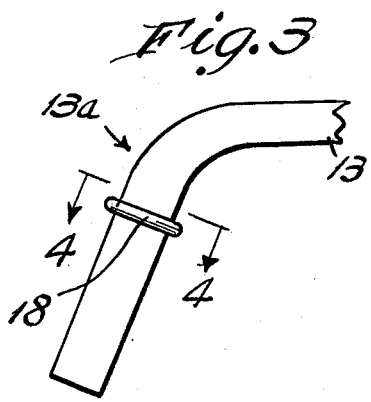
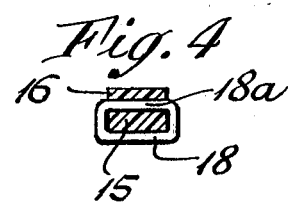
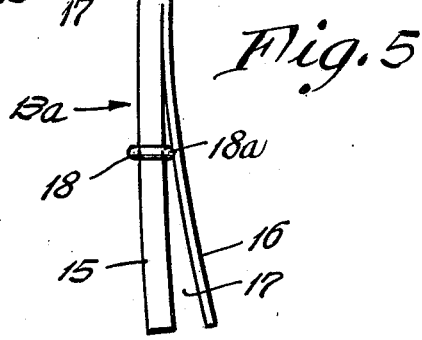

3,479,110
SPECTACLES HAVING TEMPLES WITH ADJUSTABLY BIASED ENDS
Stanley M. Fromm, 551 Joan Drive,
Fairfield, Conn. 06430
Filed Aug. 17, 1967, Ser. No. 661,358
Int. Cl. G02c 5/14, 5/16
U.S. Cl. 351—123                           3 Claims

ABSTRACT OF THE DISCLOSURE

Temple members which are used in connection with spectacle or eyeglass frames are provided at their free ends or terminal portions with a pair of inner and outer leaves, the inner leaf to engage the head and the outer leaf to carry means for adjusting the position of the inner leaf to maintain it in proper holding contact with the head.

---

Heretofore, temple members for spectacles or eyeglasses were bent, as a whole, to provide the proper fit. Usually this was a "cut and try" operation. If the temples were made of plastic or the like material, it usually required heating and softening of the material to permit the bending thereof. In other arrangements the temple members were baised by resilient means at the hinge thereof into engagement with the head. This continual pressure was uncomfortable.

The present invention provides a means for easily and quickly adjusting the free end portions of the temples into proper and comfortable engagement with the head of a person wearing the spectacles to hold the spectacles in place thereon. This is accomplished by providing the free end of the temples with a pair of leaves, the outer leaf being relatively rigid and the inner or head-engaging leaf being flexible and providing means for flexing the inner leaf into firm but comfortable contact with the head to hold the spectacles in place.

In the preferred form of the invention the leaves are formed by providing a vertical slot in the free end of the temple to extend therethrough and inwardly thereof the required length. The inner leaf is more flexible than the outer leaf which carries means for engaging the inner leaf and causing it to be flexed into a position in which it comfortably engages the head of the wearer with sufficient pressure to hold the spectacles in position.

The means for flexing the inner leaf can take many forms but a simple means for accomplishing this is a ring or the like member slidably and frictionally carried by the outer leaf and disposed in the slot and so arranged that as the ring moves inwardly from the free end of the temple toward the apex of the slot the inner leaf will be flexed to a greater extent.

Other features and advantages of the invention will be apparent from the specification and claims when considered in connection with the accompanying drawings in which:

FIG. 1 is a perspective view showing spectacles having temple elements of the present invention.

FIG. 2 is a top view of the spectacles of FIG. 1.

FIG. 3 is an enlarged side view of the free end of the temples.

FIG. 4 is a sectional view taken along line 4—4 of FIG. 3.

FIG. 5 is an enlarged end view of the free end of a temple.

As shown in the drawings, the usual spectacles or eyeglass frame 10 carrying lenses 11, 12 is provided with temples or bows 13 which have their forward ends hinged to the frame by hinges 14. The temples normally are positioned along the side of the head of the wearer (not shown) and hold the spectacles in position.

According to the present invention, means is provided at the free end of the temples enabling the temples to be readily adjusted to hold the spectacles in position.

As shown, the free end or terminal portion 13 of the temple 13 comprises a pair of leaves 15, 16. The outer leaf 15 is relatively rigid or stiff and the inner leaf 16 is flexible and adjustable with respect to the leaf 15 so as to conform to the shape of the head of the wearer and comfortably engage the same to hold the spectacles in position. Preferably, the adjusting means is carried by the leaf 15 and is operated to cause deflection of the leaf 16 with respect thereto.

In the illustrated form of the invention, the temples are made from a thermoplastic material and leaves 15, 16 are formed integrally therewith by providing a vertically disposed slot 17 extending therethrough and inwardly of the free end a predetermined distance. As shown in FIGS. 1, 2 and 5, the leaf 16 is substantially thinner than leaf 15 and is capable of flexing with respect thereto. The slot preferably extends inwardly of the temple to a point 13b which is normally located above the ear.

While various means may be provided on leaf 15 for producing the deflection of leaf 16, in the herein illustrated form of the invention this comprises a ring 18 slidably and frictionally carried by leaf 15 and having a portion 18a disposed in the slot and engaging leaf 16, as shown in FIGS. 4 and 5, so that as the ring is moved toward or away from the apex 17a of the slot, the leaf 16 will be more or less flexed with respect to leaf 15.

From the foregoing it will be seen that there is provided a very simple and effective means for adjusting the temples for spectacles into a comfortable holding position with the head by merely adjusting the leaf 16 with respect to the leaf 15 and thus eliminating the necessity of bending or otherwise deforming the temple member as a whole as was heretofore required. This also eliminates the constant pressure caused by means at the hinge for normally urging the ends of the temples toward one another and into engagement with the head.

I claim:
1. Spectacles comprising temples each of which is of one piece construction having one end pivotally connected to the spectacles and a free end, the free end being provided with a slot extending therethrough and along the temple a predetermined distance to form a pair of leaves of temple material in side-by-side relation, the outer leaf being relatively rigid and the inner leaf being flexible, and adjustable biasing means carried by the outer leaf of each temple and acting on the inner leaf causing the inner leaf to be flexed with respect to the outer leaf so as to engage the head of the wearer with a comfortable pressure to hold the spectacles in position thereof.

2. The invention as defined in claim 1 wherein the elongate elements are formed of resilient molded plastic and the inner leaf is thinner than the outer leaf.

3. The invention as defined in claim 1 wherein the last-named means comprises a ring slidably and frictionally carried by the outer leaf and having a portion disposed in the slot to engage both leaves and cause the inner leaf to flex as the ring moves along the slot from the free end.

References Cited

UNITED STATES PATENTS

| | | | |
|---|---|---|---|
| 1,719,957 | 7/1929 | Arrick | 351—123 |
| 2,064,604 | 12/1936 | Hempel | 351—113 |
| 2,094,236 | 9/1937 | Hempel | 351—113 |
| 2,280,666 | 4/1942 | Schofield | 351—123 |
| 2,495,508 | 1/1950 | Cleaver | 351—52 |

FOREIGN PATENTS 1,039,279  8/1966  Great Britain.

DAVID SCHONBERG, Primary Examiner
J. W. LEONARD, Assistant Examiner

U.S. Cl. X.R.

351—113, 114